United States Patent [19]

Watanabe et al.

[11] Patent Number: 4,710,017
[45] Date of Patent: Dec. 1, 1987

[54] OPTICAL UNIT HOLDING DEVICE FOR COPYING MACHINES

[75] Inventors: Toshio Watanabe, Takatsuki; Eiji Tsutsui, Amagasaki; Arihiro Tsunoda, Higashiosaka, all of Japan

[73] Assignee: Mita Industrial Co., Ltd., Japan

[21] Appl. No.: 879,732

[22] Filed: Jun. 26, 1986

[30] Foreign Application Priority Data

Jun. 27, 1985 [JP] Japan ................ 60-142293
Sep. 30, 1985 [JP] Japan ................ 60-218790
Sep. 30, 1985 [JP] Japan ................ 60-218792
Sep. 30, 1985 [JP] Japan ................ 60-218793

[51] Int. Cl.$^4$ .................. G03G 15/00; G03G 15/28; G03B 27/34
[52] U.S. Cl. .................. 355/8; 355/3 R; 355/51; 355/57
[58] Field of Search .......... 355/3 R, 8, 14 R, 51, 355/57, 11, 66

[56] References Cited

U.S. PATENT DOCUMENTS

| | | |
|---|---|---|
| 4,353,643 | 10/1982 | Staff ........................ 355/57 |
| 4,355,883 | 10/1982 | Landa ....................... 355/8 |
| 4,367,945 | 1/1983 | Abe .......................... 355/51 |
| 4,403,877 | 9/1983 | Jones et al. ............. 355/8 X |
| 4,436,416 | 3/1984 | Negoro et al. .......... 355/57 |
| 4,448,514 | 5/1984 | Fujii et al. ............... 355/8 |
| 4,487,497 | 12/1984 | Kimura et al. .......... 355/8 |
| 4,494,866 | 1/1985 | Rattin et al. ............ 355/57 |
| 4,519,697 | 5/1985 | Takeda et al. .......... 355/14 R |

Primary Examiner—A. C. Prescott
Attorney, Agent, or Firm—Beveridge, DeGrandi & Weilacher

[57] ABSTRACT

An optical unit holding device for copying machines having a pair of stationary slide members attached to one end of a support frame proper which holds an optical unit reciprocating for document exposure, and another pair of slide members which is turnably attached to the other end of the support frame proper, thereby holding the support frame proper on a slider at four points by a manner that each pair of the slide members is supported on the slider, and further a driving wire is connected respectively to each end of the support frame proper.

7 Claims, 10 Drawing Figures

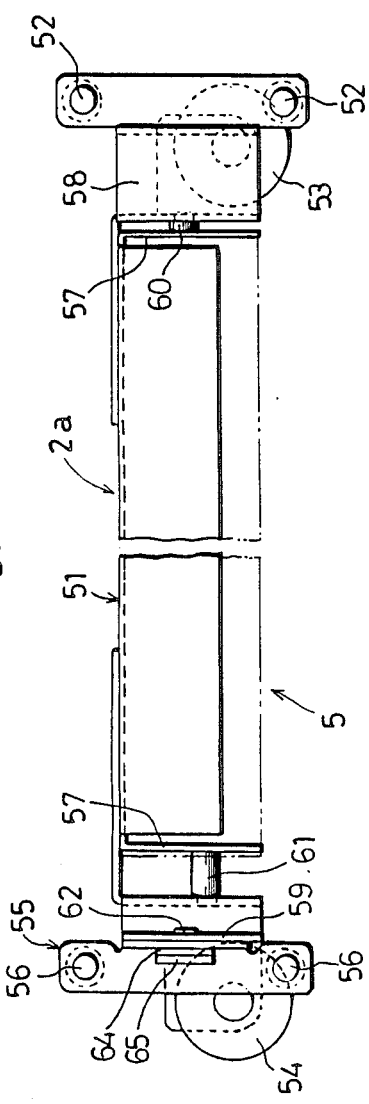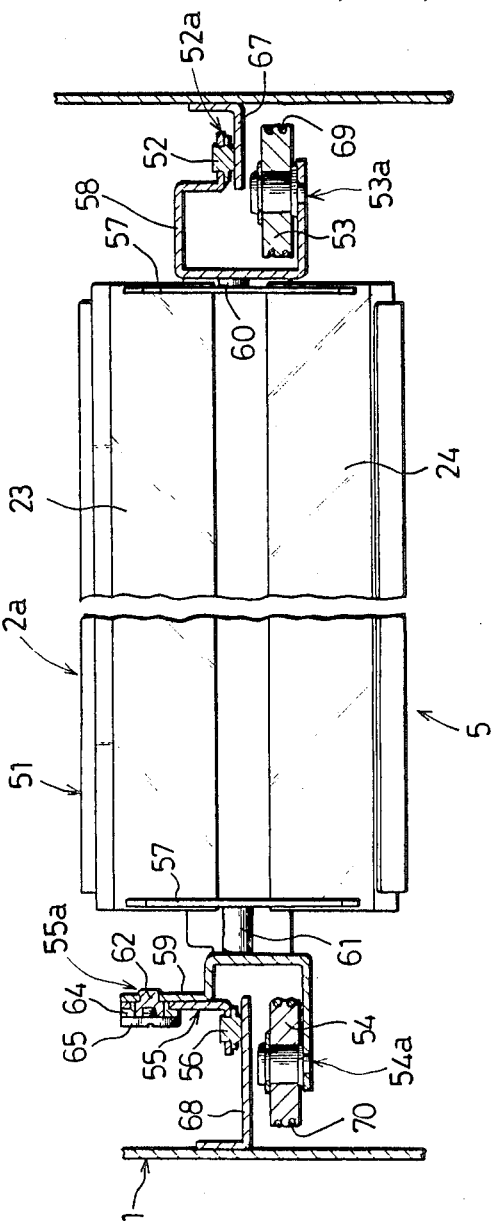

OPTICAL UNIT HOLDING DEVICE FOR COPYING MACHINES

BACKGROUND OF THE INVENTION

The present invention relates to an optical unit holding device for copying machines, more particularly, for the copying machines of the type of which optical unit is reciprocated for document exposure.

Most of the copying machines provided so far have been the type to expose the documents set on a stationary contact glass by moving back and forth an optical unit having a lamp and reflecting mirrors under the cotnact glass so as to enable compact design of the copying machine and high-speed copying.

Known as a type of reciprocate the optical unit in this manner is the optical unit holding device in which a slide shaft is passed through a hole formed on one end of the support frame to which the optical unit is attached, a slide member attached to the other end of the support frame is held on a slider, and a driving wire is wound around a pulley attached to the other end of the support frame to transmit driving force only to one side of the support frame.

With the optical unit holding device as described above, the support frame can be attached more accurately by making longer a length of the support frame through which the slide shaft is passed in an axial direction. Longer support frame where the slide shaft goes through, however, causes a problem since the support frame becomes longer and larger. If the length where the slide shaft passes through is made shorter to make the support frame smaller, on the other hand, parallelism of the optical unit may not be sufficient, causing a problem that the support frame is kept vibrated for a long time in the initial stage of moving for image forming, and the obtained copyed image is outstandingly deformed at the top thereof which corresponds to the initial stage of transfer in the optical unit.

Another optical unit holding device of known composition is of the type in which a slide member is attached to the bottoms of both ends of the support frame to which the optical unit is fixed, a pulley is attached respectively to each end of the support frame, the slide member at each end is held respectively on a slider, and a driving wire is wound around each pulley to transmit driving force to both sides of the support frame.

The optical unit holding device of the above composition can be such type, for example, in which three slide members are attached to the ends of the supprot frame so that all the slide members are put in contact exactly with the slider, or the type in which four slide members are attached to the ends of the support frame, and the support frame itself is made flexible so that all the slide members are put in contact with the slider (Japanese patent Publication (unexamined) No. 154434/1984).

All of the optical unit holding devices described above are advantageous in that the accuracy of the support frame itself need not be very accurate as the parallelism can be adjusted by winding the two driving wires and that the copying machine can be designed small-sized and lightweighted easily.

With the optical unit holding device of the 1st or former composition as described above, however, one end of the support frame to which driving power is transmitted by the driving wire is put in contact with and held onto the slider by two slide members, and the other end of the support frame is put in contact with and held onto the slider by one slide member only. When driving power is transmitted by the driving wires, therefore, one end of the support frame put in contact and held by one slide member only is greatly worn out, causing such problems as a generation of deflection of the supprot frame and the optical unit, degrading the quality of the obtained copied image.

With the optical unit holding device of the 2nd or latter composition described above, such deflection of the support frame can be avoided, because both ends of the support frame are respectively and exactly put in contact with and held onto the slider by the two slide members. If a weight balance of the support frame itself is disordered when the optical unit is attached to the support frame, however, inertia moment at transfer of the optical unit also differs as the support frame itself is flexible. Accordingly, the support frame itself is twisted by a disordered weight balance, causing deflection of the optical axis, so that a problem is generated wherein a quality of the copied image is degraded.

When the optical unit is reciprocated back from the exposure ending position to the home position, and again starts to move for exposure, a force is applied to the slide member in lifting direction upward from the slider at the exposure-start position adjacent to the home position. This also causes such troubles that the deflection at the top end takes place and image quality is degraded. When a speed of returning from the exposure end position to the home position is made faster to meet the demand for high-speed copying, in particular, the trouble mentioned above becomes more outstanding.

Moreover, a feeder wire is connected to the lamp to supply power. Within a specific range near the end position of forward motion of the optical unit determined by an attaching condition of the feeder wire, the radius of curvature of the feeder wire is smaller. This means that a force is applied to one of the pair of slide members which come in contact with the top surface of the slider in a direction to life up the slide member from the slider. Under that condition where the pair of slide members is forced upward, quality of the copied image is lowered due to deflection of the optical unit.

For the type of copying machines of which optical unit is moved, a power is transmitted from the driving source to the optical unit through wires for the advantages capable of simplifying a structure and easily obtaining a relationship between lamp transfer speed and reflector transfer speed at a ratio of 1:2. Some of them are so contrived to prevent exposure failure due to twist of the optical unit, or the like, by transmitting the power through wires to both sides of the optical unit. In this case, the optical unit is held onto the guide rail by its own weight to prevent deflection of the optical unit in vertical direction, and pulleys are respectively attached to both sides of the supprot frame supporting the optical unit and a driving wire is wound around both pulleys to apply downward force. To be more specific, the pulleys are vertically disposed and the wires are wound around the pulleys so that the pulleys can be rotated, and the pulleys are applied with downward forces through both wires wound around the pulleys, preventing lifting-up of the support frame (Japanese Patent Publication (unexamined) No. 37669/1983).

In the optical unit holding device of the above composition, pulleys are usually attached to the outside of the side plates enclosing the support frame. This arrangement, however, involves a problem that the range to accept electrical parts at outside of the side plates is narrowed or restricted by the range determiend by pulley diameter and optical unit transfer distance. Since diameter of the pulleys is substantially larger than the width thereof, the range determined by pulley diameter and optical unit transfer distance is rather extensive, which lowers the efficiency for using the space within the copying machine.

Another optical unit holding device known is the type in which both pulleys are allowed to rotate freely within the horizontal plane, a wire is wound around the pulleys in the same direction between the two pulleys and the center of gravity of the support frame is set at the same height as the center of gravity of the pulleys so as to prevent lifting up of the support frame (Japanese Patent Publication (unexamined) No. 156965/1984).

With the optical unit holding device composed as described above, however, the center of gravity of the support frame comes between the pitch of wire winding, since the wires are wound around the pulleys by one turn only, although the center of gravity is set at the same height as that of the pulleys. Accordingly, the position where driving power of the wire applies does not coincide with the gravity position of the support frame, and since the wires are wound in the same direction around both pulleys, a deflected tensile force is applied to the support frame. This causes a problem of lifting the support frame from the guide rail.

SUMMARY OF THE INVENTION

The primary object of the present ivnention is to provide an optical unit holding device for copying machines which form high quality copy image at a high speed.

A further object of the invention is to provide an optical unit holding deivce for copying machines which prevent deflection of the optical unit and the support frame so as to obtain high quality copy image.

A further object of the invention is to provide an optical unit holding device for copying machines which put the slide members attached to the support frame exactly in contact with surface of the slider regardless of the accuracy of the support frame itself to which the optical unit is attached.

A further object of the invention is to provide an optical unit holding device for copying machines which ensures stable exposure by offsetting the turning moment in vertical direction applied to the support frame when the optical unit travels for exposure at a high speed.

A further object of the invention is to provide an optical unit holding device for copying machines which improves the efficiency for using the space within the copying machine and ensure stable exposure.

It is still further object of the invention to provide an optical unit holding device for copying machines which is free from any force to lift the slide members from the slider when the optical unit travels for exposure at a high speed.

It is still more further object of the invention to provide an optical unit holding device for copying machines which put the slide members exactly in contact with the surface of a pair of sliders with no regard to variety of radius of curvature of the feeder wire.

To realize the above objects, the optical unit holding device for copying machines according to the present invention is provided in the upper chamber of a copying machine separated from the lower chamber. The optical unit holding device for copying machines comprises a support frame having a support frame proper to support the optical unit moving back and forth for exposure of documents set on the contact glass, two pairs of slide members attached respectively to the bottom of both ends of the support frame, and an end member attached to either one of the two pairs of slide members. The end member is connected to the support frame proper so as to turn freely in the plane including a slider which is holding the slide members, and a driving wire to transmit driving power is attached respectively to the end member and the support frame proper, and the pairs of slide members are respectively held on the corresponding slider.

In a preferred embodiment of the invention, a pair of slide members and one pulley are attached to one end of the support frame proper, and another pulley is attached to the other end of the support frame proper. A pair of slide members are also attached through the end member which is connected to the support frame proper so as to turn freely. A slider to which the pairs of slide members are respectively put in contact is attached to both ends inside the copying machine and a driving wire to transmit driving power is wound around every one of the pulleys. By the optical unit holding device composed in this manner, the pairs of slide members are respectively put in contact exactly with the slider when the optical unit reciprocates, so that deflection of the optical unit is prevented.

Pulleys which turn freely within horizontal plane are attached to both ends of the support frame mounting the optical unit and in a perpendicular direction to travelling direction of the optical unit for document-exposure, and a driving wire is wound around the pulleys in vertically-opposite direction to each other between the pulleys. By this arrangement, the moment in vertical direction acting upon the support frame when the optical unit reciprocates for document exposure is offset to ensure stable exposure.

In another preferred embodiment of the invention, a rotation actuating member which turns the slide member to be attached to the end member so as to be put in contact with the sliders is attached to the home position side of the support frame. The rotation actuating member turns the support frame proper in the direction to restrain the the turning due to restoration of the feeder wire to supply power to the lamp of the 2nd optical unit having a lamp and reflecting mirrors to reflect the light from lamp, and a driving wire to transmit driving power is also attached to the support frame proper. By an optical unit holding device of this composition, the slide members can be put exactly in contact with the slider even when the driving force of the driving wire is applied to the support frame or the restoration force of the feeder wire is applied to the support frame causing to turn the support frame, and the optical unit travel for exposure without being deflected. It is preferable that the rotation actuating member is provided with a spring member to press down the end member and an interlocking member to prevent turning of the support frame proper.

These objects of the invention mentioned above and still other objects will be further apparent from the detailed description given below referring to the accompanying drawings.

BRIEF DESCRIPTION OF THE DRAWINGS

FIG. 2 is a plan view of the support frame of FIG. 1;

FIG. 3 is a side view of the supprot frame of FIG. 1;

DETAILED DESCRIPTION OF THE PREFERRED EMBODIMENT

Referring now to the accompanying drawings showing some preferred embodiments of the optical holding device for copying machines, the present invention is described further in detail.

Figure 4:
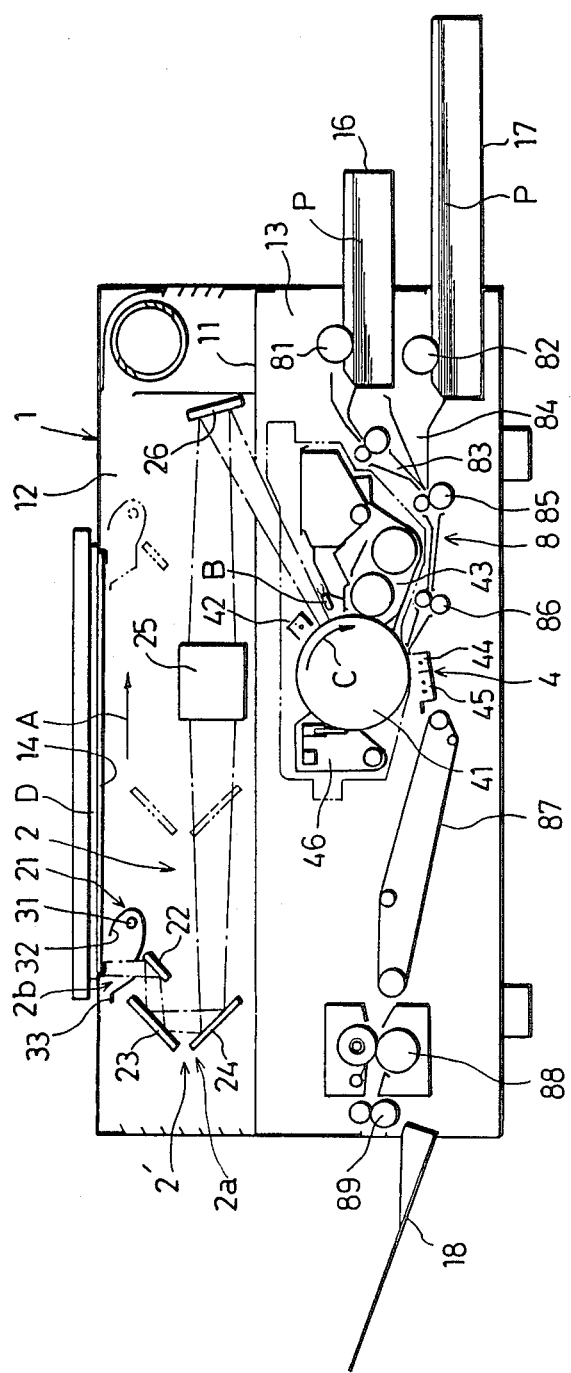
FIG. 4 is a diagramatic view to show internal mechanism of a copying machine.

In FIG. 4, the inside of the copying machine 1 is separated into the upper chamber 12 and the lower chamber 13 by a partition plate 11. In the upper chamber 12, an optical system 2 is provided for scanning and exposure of the document D set on the contact glass 14, and in the lower chamber 13, a copying section 4 to form copy images on the copying paper P and a paper conveying section 8 to feed a copying paper are provided, respectively.

The optical system 2 has a lamp 21 to expose the document D on the contact glass 14, plane deflecting mirrors 22, 23, 24 to reflect the light from the lamp 21 in sequence, a lens 25 through which goes the light from the reflecting mirror 24, and a stationary plane reflecting mirror 26 to form images on the photoreceptor drum 41 by the light coming through the lens 25. The lamp 21 comprises a light emitting element 31, main reflecting mirror 32, and sub-reflecting mirror 33. The document D on the contact glass is scanned and exposed by moving the lamp 21 and the plane reflecting mirrors 22, 23, and 24 in the direction shown by arrow A in the drawing.

The plane reflecting mirrors 23, 24 (hereinafter referred to as the 1st optical system 2a) are also attached to the support frame proper 51 (See FIG. 1), and are moved together. The lamp 21 and the plane reflecting mirror 22 (hereinafter referred to as the 2nd optical system 2b) are also attached to the support frame proper 151 (See FIG. 8) to be moved together.

Transfer speed of the 2nd optical system 2b is set by the pulleys 53, 54 twice as fast as the transfer speed of the 1st optical system 2a.

In the following description, the lamp 21 and the plane reflecting mirrors 22, 23, 24 are generally called the optical section 2'.

The paper conveying section 8 has feed rollers 81, 82 to take out the copying paper P from the upper and lower paper feed cassettes 16, 17, paper feed pathes 83, 84 to carry the taken out copying paper P, a resist roller 85, a delivery roller 86, a carrier belt 87 to carry the copying paper coming through the copying section 4, a heating and fusing roller 88 to fix the toner image on the copying paper P, and a paper discharge roller 89.

The copying paper conveying section 8 is so composed that either one of the feed rollers 81, 82 is selectively driven to take out a sheet of copying paper P from either one of the paper feed cassette 16, 17, and the copying paper P is guided to the copying section 4 to transfer the toner image onto the paper, the toner image is heated by the heating and fusing roller 88 for fixing, then the paper is discharged onto a tray 18.

The paper conveying section 8 is not limited to the above described composition. It may also be possible to employ a paper conveying section of another composition according to the prior art, for example, a type having the paper feeding and discharging mechanisms at the same side.

Where the toner stocked in the developing device 43 described in the following text is a pressure sensitive tonner containing ferrite and wax, and the like, a compression roller may be used in place of the above mentioned heating and fusing roller 88.

In the copying section 4, a corona discharger 42, blank lamp B, developing device 43, transfer charger 44, separating charger 45, and cleaner 46 are provided around the photoreceptor drum 41, which turns in C direction shown in the drawing.

The photoreceptor drum 41 has a photo-sensitive layer of selenium or of cadmium sulfide on the surface. In this copying section 4, document images are formed by the optical section 2 on the outer surface of the photoreceptor drum 41 evenly charged by corona discharge of the corona discharger 42 to create electrostatic latent images. The electrostatic charge on the periphery where no latent images are formed is removed by the blank lamp B. Then the electrostatic latent images are turned apparent into toner images by the toner stocked in the developing device 43, the toner images are transfered onto the copying paper P by the transfer charger 44, the copying paper with the toner images is separated from the photoreceptor drum 41 by the separating charger 45, and the remaining toner on the photoreceptor drum 41 is recovered by the cleaner 46.

The copying section 4 is not limited to the above-described composition, and other compositions known to those skilled in the art may be applicable, such as a sensitive belt having a photosensitive layer containing zinc oxide. It may also be possible to employ a separating member to separate the copying paper P with toner images mechanically from the photoreceptor drum 41 in place of the above-mentioned separating charger 45.

Figure 1:
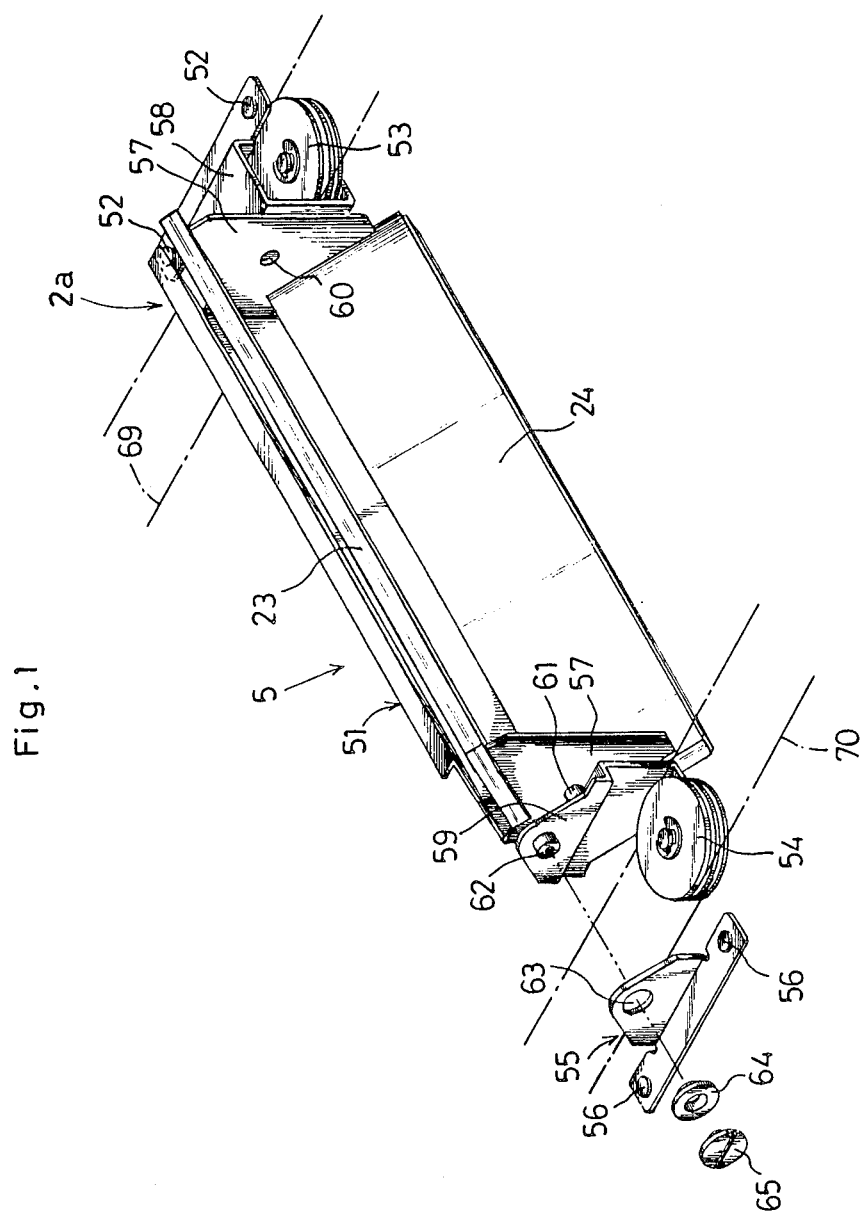
FIG. 1 is a perspective view showing an embodiment of a support frame to which the 1st optical unit is attached.

FIG. 1 to FIG. 3 show a supprot frame 5, and the support frame 5 has a frame proper 51 and reflecting mirrors 23, 24 constituting the 1st optical system 2a, which is attached to the predetermined position on the support frame proper 51.

A pair of slide members 52, 52 and a pulley 53 are attached to the specified position at one end of the support frame proper 51, and another pulley 54 is attached to the specified position at the other end of the support frame proper 51. An end member 55 which turn around the support frame proper 51 is connected to the specified position of the other end of the support frame proper 51, and a pair of slide members 56, 56 are attached to the specified position of the end member 55.

The slide members 52, 56 are preferably made of Teflon of small friction coefficient.

The 2nd optical system 2b is attached to another support frame (not illustrated) to similar composition to that of the above mentioned support frame 5.

To be more specific, the support frame proper 51 has a reflecting mirror mounting seat 57, a slide support 58 and another slide support 59. The reflecting mirror mounting seat 57 formed by folding a sheet of flat plate bent to right angle at both ends. The slide support 58 has a pulley mounting seat 53a to which a pulley 53 is attached and formed by another sheet of flat plate bent to right angle at the lower part and also has a slide member mounting seat 52a to which the pair of slide members 52, 52 are attached and formed by the same sheet of flat plate bent to right angle at the top and bent further to L-shape.

The slide support 59 formed by another sheet of flat plate bent to right angle at the lower part to form a pulley mounting seat 54a to which another pulley 54 is attached, and the upper end of the plate is bent at right angle and further upright at right angle to form an end member joint section 55a to which the end member 55 is connected so as to turn freely.

The reflecting mirror mounting seat 57 is connected to the slide supprots 58, 59 by shafts 60, 61 in stationary manner. The end member 55 has a hole 63 through which the shaft 62 attached to the specified position of the slide support 59 goes intermediated by a bearing 64, and a bolt 65 to prevent dropping of the bearing 64 is attached to the shaft 62.

As shown in FIG. 3, sliders 67, 68 to support the slide members 52, 56 are attached to both ends inside the copying machine proper 1.

Accordingly, the slide members 52, 56 are held on the sliders 67, 68 attached respectively to the copying machine proper 1 and the pulleys 53, 54 are positioned under the slider 67,68. The driving wires 69, 70 are wound around the pulleys 53, 54.

In this embodiment, the optical system 2' is so composed that the support frame 5 comprising the reflecting mirrors 23, 24 as the 1st optical system 2a attached to the support frame proper 51 is moved by two pulleys 53, 54 and driving wires 69, 70. It is possible, for example, to apply the same arrangement of the support frame (not illustrated) as described above to the 2nd optical system 2b of the optical system 2' comprising the lamp 21 and the reflecting mirror 22.

In this case, transfer speed of the supprot frame supporting the 2nd optical system 2b comprising the lamp 21 and the reflecting mirror 22 is twice as fast as the transfer speed of the support frame 5 in the above described embodiment. Accordingly, the pulleys 53, 54 are not necessary and the driving wires 69, 70 must be attached directly to the support frame.

Since the end member 55 is attached so as to turn freely to the support frame proper 51 in the optical unit holding device of the above composition, it is possible to put each pair of slide members 52, 52, 56, 56 exactly in contact with surface of all the sliders 67, 68 by adjusting relative position of the pairs of slide members 52, 52, 56, 56.

It is also possible to adjust parallelism of the support frame 5 and of the 1st optical system 2a by adjusting winding condition of the driving wires 69, 70 around the pulleys 53, 54.

Accordingly, documents are exposed without any deflection of the 1st optical unit 2a to obtain copy image of high quality even when the optical system 2' is reciprocated by the driving wires 69, 70 for copy image forming.

As shown in FIG. 1 to FIG. 3, the pulleys 53, 54 are positioned at a same height and attached at right angles to exposure direction of the 1st optical system 2a. Under ordinary condition, the slide members 52, 52, 56, 56 are also positioned at a same height and each pair of the slide members 52, 52, 56, 56 are attached at right angles to the exposure direction of the 1st optical system 2a.

When the pulleys 53, 54 and the slide members 52, 56 are attached in the arrangement as described above, the slide members 52, 56 are held on the sliders 67, 68 attached respectively to the copying machine proper 1, the pulleys 53, 54 are positioned under the sliders 67, 68 and are held so as to turn freely within the plane.

Figure 5:
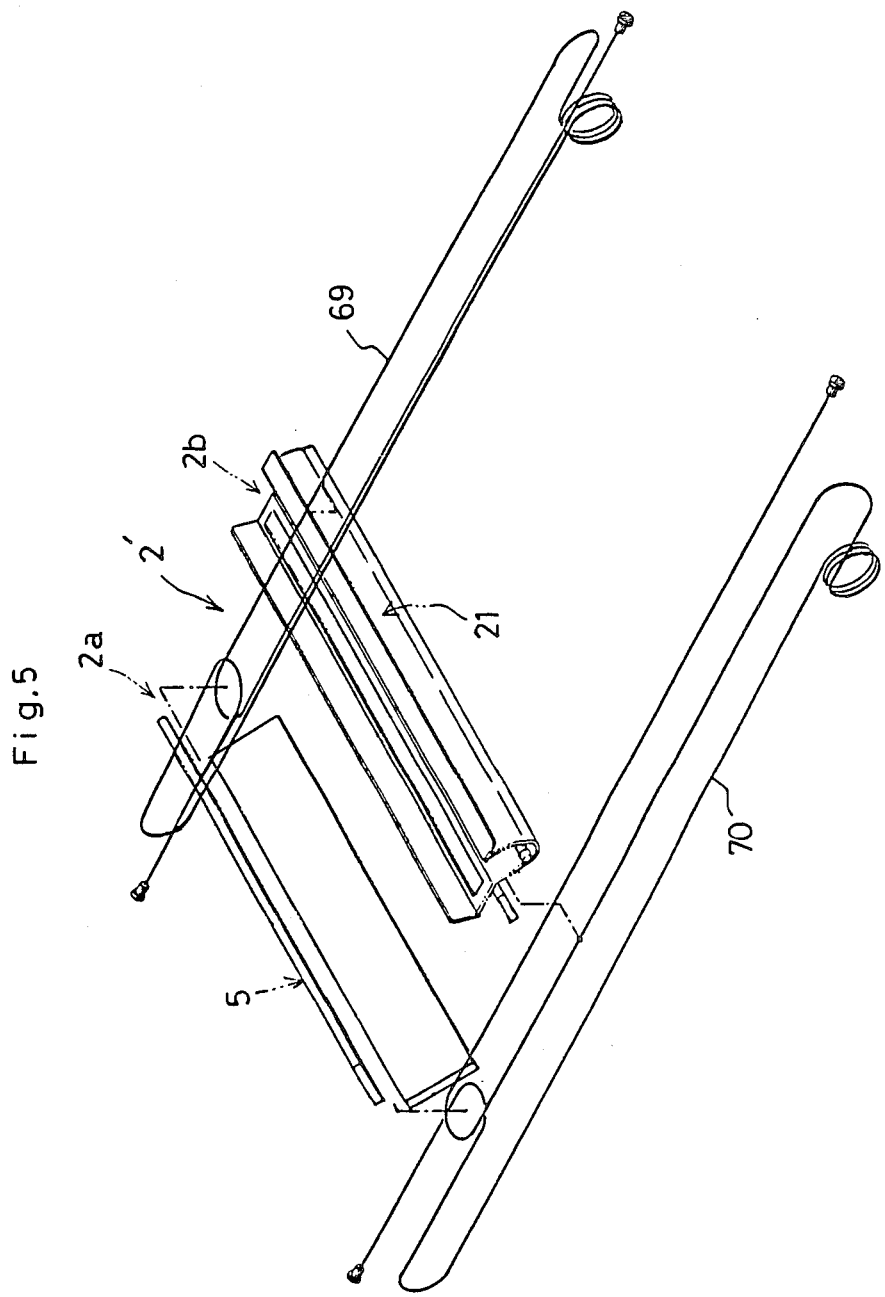
FIG. 5 is a diagramatic view showing winding condition of driving wires.
Figure 6:
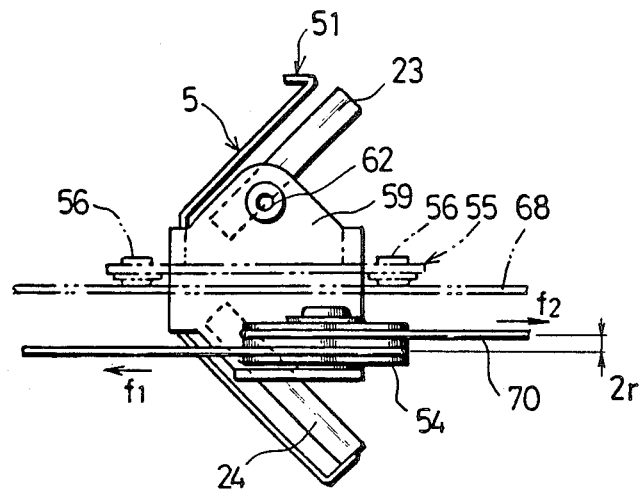
FIG. 6 shows winding condition of a driving wire around one pulley.
Figure 7:
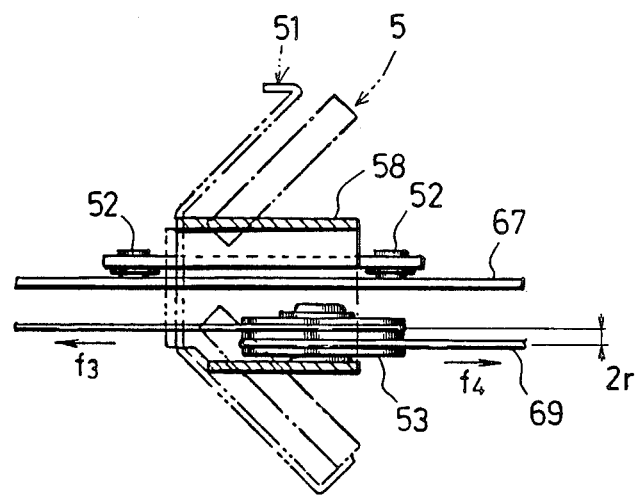
FIG. 7 shows winding condition of a driving wire around another pulley.

Moreover, the driving wires 69, 70 are wound around the pulleys 53, 54 in vertically-opposite direction each other as shown in FIG. 5 to FIG. 7.

With the optical unit holding device having driving wires 69, 70 wound around the pulleys 53, 54 as described above, the optical system 2' is moved without any twist on the support frame 5 by applying the same driving power with respect to transfer direction of the optical system 2' because the driving wires 69, 70 are wound in virtically-opposite direction each other around the pulleys 53, 54 attached to both ends of the support frame proper 51 so as to turn freely.

When driving power is applied by the driving wires 69, 70, upward turning power acts upon one pulley around the center of gravity of the support frame proper 51. To the other pulley, on the other hand, downward turning power is applied around the center of gravity of the support frame proper 51.

In other words, power is applied in opposite direction each other, upward and downward, and the support frame 5 is held firmly and stably onto the sliders 67, 68 intermediated by the slide members 52, 56.

To be more specific, the driving wires are wound around the pulleys spaced apart by 2r, and the tensile force applied to one pulley by a driving wire in virtically-opposite direction each other is respectively f1, and f2, and the tensile force applied to the other pulley by another driving wire in virtically-opposite direction each other is respectively f3, and f4, as shown in FIG. 6 and FIG. 7. Under the above assumption, f1÷f3 and f2÷f4 and the moment applied to the whole support frame is given by the following equation.

$$r(f1-f2)-r(f3-f4)=r(f1-f3)-r(f2-f4)$$

As is evident from the above equation, the moment acting upon the whole support frame 5 is micronous and the pairs of the slide members 52, 52, 56, 56 of the support frame 5 can be held in stable condition on each one of the sliders 67, 68.

With an optical unit holding device having the composition as described above, turning moment in vertical direction of the support frame 5 and of the optical system 2' can be minimized by setting the driving wires 69, 70 on the pulleys 53, 54 in vertically-opposite direction each other, upward and downward, then stable exposure by the optical system 2' is ensured.

Moreover, the space determined by transfer of the pulleys 53, 54 in horizontal direction, i.e. width and transfer distance of the pulleys 53, 54 can be smaller because the pulleys are attached so as to turn freely within horizontal plane. This makes it possible to attach the electrical parts more efficiently and more freely.

Copying machines having pulleys attached so as to turn freely in horizontal plane can be designed small more easily then those having pulleys attached so as to turn freely in vertical plane as most of the electrical parts are larger than the diameter of the pulleys.

Figure 8:
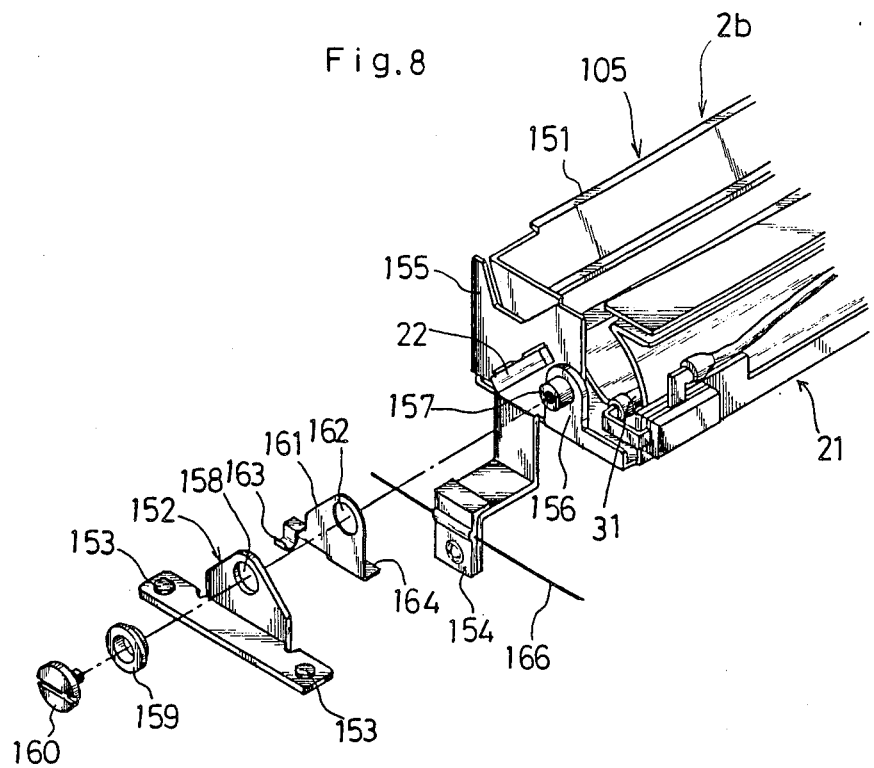
FIG. 8 is an exploded perspective view of the key part of the support frame to which the 2nd optical unit is attached.
Figure 9:
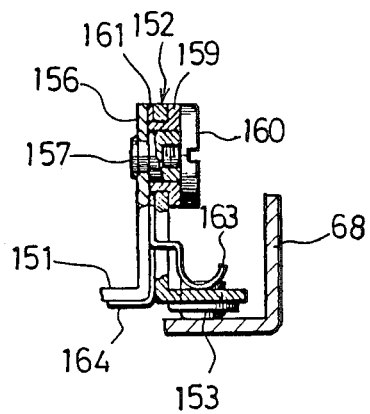
FIG. 9 is a partially cut-off side view of the support frame of FIG. 8.
Figure 10:
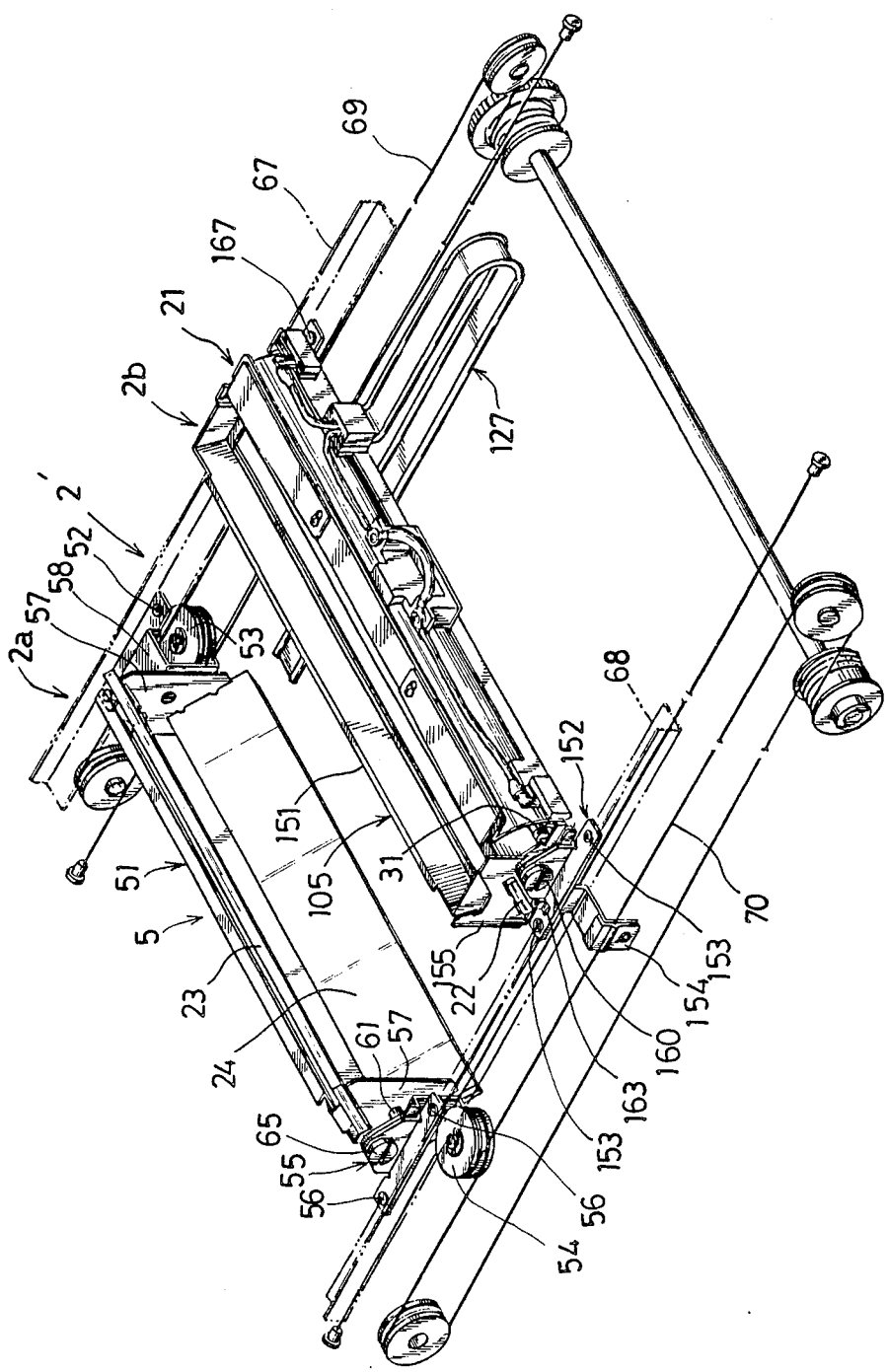
FIG. 10 is a perspective view of an optical unit.

An example of the 2nd optical system 2b attached to the support frame is sown in FIG. 8 to FIG. 10. In this example, the support frame 105 has a support frame proper 151, and the 2nd optical system 2b comprising a lamp 21 and a reflecting mirror 22 attached to the specific positions of the support frame proper 151.

An end member 152 which turn around the support frame proper 151 is connected to one end of the support frame proper 151 and a pair of slide members 153, 153 and a driving wire joint 154 are attached to the specific positions of the end member 152. A pair of slide members 167, 167 are also attached to the other end of the support frame proper 151.

To be more specific, the supprot frame proper 151 comprises a reflecting mirror mounting seat 155 formed by a sheet of flat plate bent at right angles on both ends, and an end member attaching seat 156 to which the end member 152 is attached so as to turn freely and is formed by the same flat plate mentioned above bent at right angles upward on the lower end.

A hole 158 through which a shaft 157 attached to the specific position of the end member attaching seat 156 goes with a bearing 159 set in-between is drilled on the above end member 152, and a bolt 160 to prevent dropping of the bearing 159 is attached to the shaft 157.

A hole 162 through which the shaft 157 loosely goes is provided at a specific position of a plate member 161 positioned between the end member 152 and the end member attaching set 157. The end at home position side of the plate member 161 is formed into a spring member 163 of semi-arc section which presses the end member 152 downward, and the bottom of the plate member 161 is formed into an interlock member 164 which comes in contact with the bottom of the support frame proper 151 to prevent the support frame proper 151 from being turned. In other words, the plate memebr 161 formed into the spring member 163 and the interlock member 164 is composed into a member to prevent turning of the support frame proper 151. Sliders 67, 68 to support each pair of slide members 153, 153, 167, 167 are also attached to the copying machine proper 1.

Accordingly, the slide members 153, 167 are held on the sliders 67, 68 attached to the copying machine proper 1. The driving wire joint 154 is fixed firmly with a screw to a specific position of the driving wire 70. The driving wire joint (not illustrated) of the other driving wire 69 is also fixed firmly with a screw in the same manner.

In the above description, only one pair of slide members 153 out of two pairs of slide members attached to both ends of the support frame proper 151 is explained. The other pair of slide members 167 are at the same height as that of the slide members 153 and are attached in a manner that the slide members 153, 167 are kept at right angles to the exposure direction of the 2nd optical system 2b.

In the embodiment, it is also possible, for example, to attach a spring member of different shape from the one mentioned in the embodiment or to attach a spring member to a position different from the position of the end member 152.

The plate member 161 having the spring member 163 and the interlock member 164 is also applicable to the support frame proper 51 holding the 1st optical system 2a which is composed of the reflecting mirrors 23, 24 in the same manner as described above.

With the optical unit holding device of the composition as described above, the slide members 153 are put in contact with the surface of the slider 68 exactly and kept hold as the end member 152 is attached so as to turn freely to the support frame proper 151.

When the support frame proper 151 and the 2nd optical system 2b attached to the support frame proper 151 proceed to exposure motion immediately after returning to the home position, therefore, documents can be exposed without any deflection of the optical system 2' and deflection at the top end of the copied image can be prevented exactly to ensure copy images of high quality.

To be more specific, parallelism of the support frame 105 can be adjusted by controlling mounting condition of the driving wires 69, 70.

Relative position between each pair of slide members 153, 153, 167, 167 can also be adjusted as the end member 152 turns to the support frame proper 151.

When the power by the driving wires 69, 70 acts upon the support frame 105, a power to turn the support frame proper 151 around the center of gravity of the support frame proper 151, i.e. a power to lift one slide member from the slider is applied to the support frame proper 151. Because of the turning effort by the spring member 163 applied to the end member 152, however, the slide members 153, 167 can be put exactly in contact with the surface of the sliders 67, 68 and kept being held.

Even when the optical system 2' is moved forward for copy image forming, two pairs of the slide members 153, 167 attached respectively to both ends of the support frame 105 supporting the 2nd optical system 2b can be held completely on the surface of the sliders 67, 68, and the documents can be exposed without any deflection of the 2nd optical system 2b which ensures copy images of high quality.

In FIG. 10, the numeral 127 shows a feeder wire to supply power to the lamp 21, the feeder wire 127 is bent and folded at a specific position corresponding to the condition of reciprocating motion of the 2nd optical system 2b.

With the 2nd optical system 2b having the feeder wire 127 as described above, radius of curvature of the feeder wire 127 becomes smaller when the support frame proper 151 comes close to the end in exposure direction for document exposure.

In this case, restoring force of the feeder wire 127 acts upon the support frame proper 151 and the support frame proper 151 is turned around the center of gravity of the support frame proper 151.

Even in this case, the slide members 153, 167 can be put in contact and held exactly on the surface of the sliders 67, 68 because of the turning force of spring member 163 acting upon the end member 152.

Even when the 2nd optical system 2b is reciprocated for copy image forming, therefore, deflection of the 2nd optical system 2b can be prevented and copy images of high quality are obtained.

If the feeder wire 127 is led from the lamp 21 to the side of the reflecting mirrors 23, 24, i.e. to the side of the 1st optical system 2a, then bent and led to the power source section, restoring force of the feeder wire 127 is applied in opposite direction from the direction described above.

Even in this case, deflection of the 2nd optical system 2b can be prevented exactly in the same manner as above to obtain copy images of high quality by forming the spring member 163 at the end of the opposite side to the home position.

While some preferred embodiments of the invention and particular modifications thereof have been described above, it should be clearly understood that the invention is not limited thereto or thereby and that various changes and modifications are possible without departing from the scope of the invention.

What we claim is:

1. An optical unit holding device for copying machines comprising a support frame having a support frame proper to hold an optical system reciprocating for exposure of the documents placed on a contact glass, pairs of slide members attached respectively to the bottom of both ends of said support frame, and an end member attached to one of said pairs of slide members; wherein said end member is connected to said support frame proper in a manner that said end member turns within the plane including a slider which is holding said slide members, a driving wire to transmit driving power is attached respectively to said end member and said support frame proper, and said pairs of slide members are respectively held on a corresponding slider.

2. An optical unit holding device for copying machines according to claim 1, wherein said pair of slide members and a pulley are attached to one end of the supprot frame proper, another pulley is attached to the other end of said support frame proper, said pair of slide members is also atatched through said end member turnably connected to said supprot frame proper, said sliders respectively supporting said pairs of slide members are attached to both ends inside the copying machine proper, and a driving wire to transmit driving power is wound around said pulleys.

3. An optical unit holding device for copying machines according to claim 1, wherein a rotation actuating member to turn the slide members to be attached to said end member so as to be put in contact with the sliders is attached to home position side of said end member, and driving wires to transmit driving power are attached to the support frame proper.

4. An optical unit holding device for copying machines as set forth in claim 3, wherein said rotation actuating member has a spring member to press down the end member and an interlocking member to prevent the support frame proper from being turned.

5. An optical unit holding device for copying machines in accordance with claim 1, wherein said optical system has a lamp and reflecting mirrors to reflect the light from the lamp, a rotation actuating member to turn the supprot frame proper in a direction to restrain turning due to restoration force of a feeder wire for supplying power to said lamp is attached to the end member, and said driving wires to transmit driving power are attached to the support frame proper.

6. An optical unit holding device for copying machines according to claim 5, wherein said rotation actuating member has a spring member to press the end member downward and an interlock member to prevent the support frame from being turned.

7. An optical unit holding device for copying machines in which pulleys which turn freely within the horizontal plane are attached to both ends of a support frame mounting an optical system in the direction perpendicular to travelling direction of said optical system, and a driving wire is wound in vertically-opposite direction to each other around said pulleys.

* * * * *